Patented Apr. 15, 1952

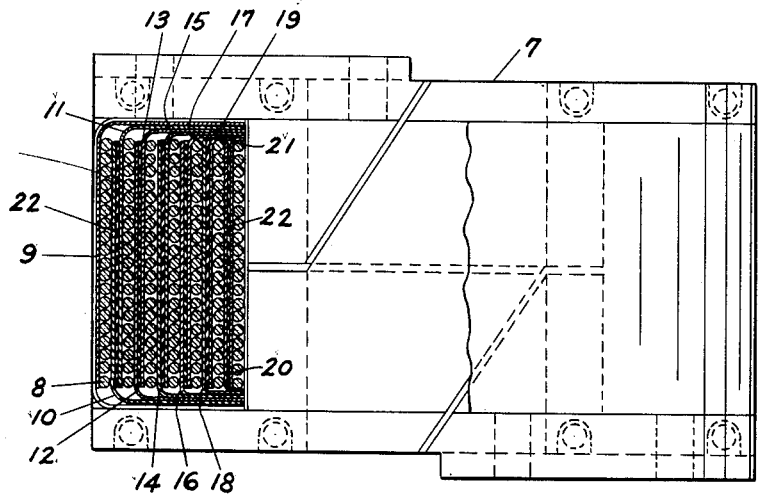
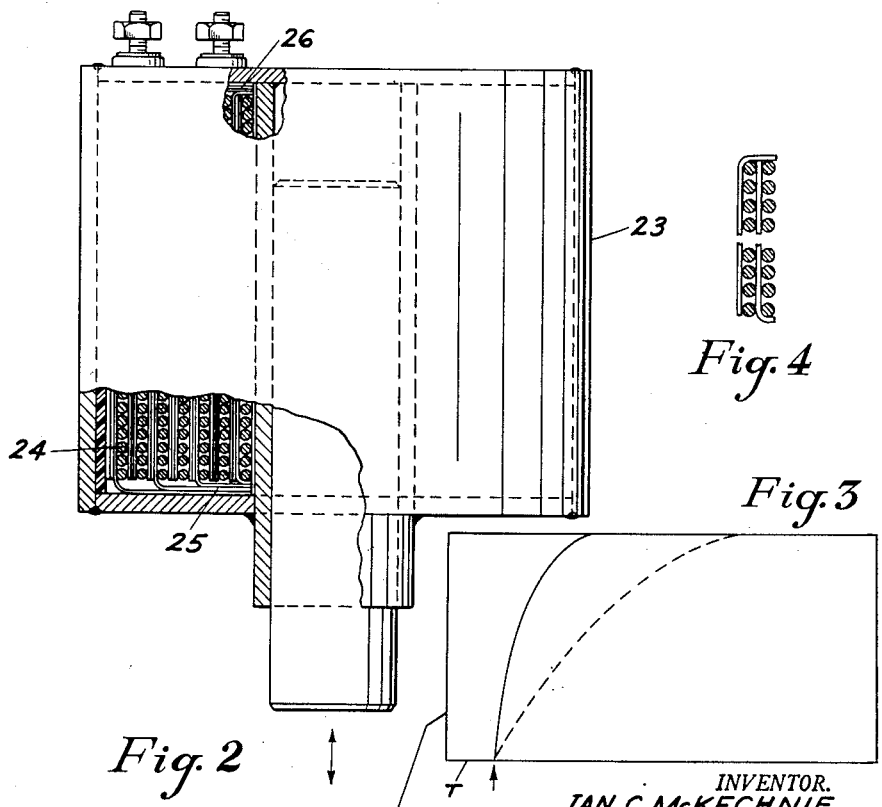

2,592,817

UNITED STATES PATENT OFFICE 2,592,817

ELECTRIC COIL

Ian C. McKechnie, Detroit, Mich., assignor to Primeweld Corporation, Detroit, Mich., a corporation of Michigan Application January 15, 1949, Serial No. 71,125

4 Claims. (Cl. 175—356)

This invention relates to electrical devices, and particularly to electric coils.

An object of the invention is to generally improve wire wound coils and to provide a coil which is simple in construction, economical to manufacture, and efficient in use.

Another object of the invention is to provide means in an electrical winding for rapidly conducting heat from the interior of the coil to the outer surface.

Another object of the invention is to provide a winding suitable for use with a welding machine transformer, which results in an exceptionally high capacity between the primary and secondary windings.

Another object of the invention is to provide a primary winding for a transformer, which is provided with heat transfer elements which are electrically connected to the secondary winding in such manner that one of said elements is adjacent each primary wire, whereby, in addition to a heat transfer action, a condenser action is also effected between the primary and secondary windings to produce increased capacity between the windings.

Another object of the invention is to provide a winding for a transformer, or the like, in which the effective impedance is reduced to a minimum.

The foregoing and other objects and advantages of the invention will become more apparent as the description proceeds, reference being made from time to time to the accompanying drawings, forming part of the within disclosure, in which drawings:

Fig. 1 is a side elevational view, with parts broken away and parts in section, of an electrical transformer embodying the invention.

Fig. 2 is an elevational view, with parts broken away and parts in section, of a solenoid having a winding embodying the invention.

Fig. 3 is a curve plotted to illustrate the results obtained by reducing to a minimum the impedance to the flow of the current in the device as illustrated in Figs. 1 and 2.

Fig. 4 is a fragmentary detail of a modified form of coil.

Referring now more particularly to the drawings, it will be understood that in the embodiment herein disclosed, Fig. 1, the reference character 7 indicates a two turn secondary winding of a welding machine transformer such as disclosed, described, and claimed in my co-pending application, S. N. 71,124, filed January 15, 1949, now Patent No. 2,553,665, to which reference is made for greater certainty.

The reference character 8 generally indicates the primary winding of the transformer carried by the secondary winding hereinabove referred to. The primary winding 8 consists of a plurality of turns of wire wound in conventional manner except as hereinafter described.

In close contact with the layers of wire of the primary winding 8 are strips of heat and electrical conductive material, such as copper or other suitable material, 9, 10, 11, 12, 13, 14, 15, 16, 17, 18, 19, 20 and 21 which are alternately directed from either end of the secondary winding 7 to which they are electrically connected by any suitable means.

It will be noted that the heat and electrical conductive strips 9 to 21 inclusive extend across respective layers of the primary winding 8, and terminate at the far side thereof. An insulating medium 22 is interposed between the adjacent strips.

The strips 9 to 21 inclusive serve to dissipate the heat from the interior of the coil to the exterior thereof and hence to the secondary winding. The overlapping of the strips 9 to 21 inclusive, with an insulating medium interposed between the overlapping portions thereof, further functions in the manner of a condenser, and greatly increases the capacity between the windings of the device.

The operation of the transformer is further enhanced inasmuch as the strips 9 to 21 inclusive tend to reduce the inductive effect of the winding which results in more rapid build up of current.

In Fig. 2 I illustrate a solenoid 23 having a winding 24, constructed in a similar manner. In this embodiment, the strips are alternately secured, as at 25 and 26 by welding or other suitable means, to the housing of the solenoid, otherwise the winding is constructed as hereinabove described.

In Fig. 3 I graphically illustrate one of the effective results obtained by using a device such as herein disclosed. In Fig. 3 the vertical line at the left indicates the current and the horizontal line at the bottom indicates the time element. The dotted curve indicates the result obtained with a coil wound in conventional manner, and the curve in a solid line indicates the results obtained with a coil wound as herein disclosed, from which it is apparent that with a given voltage operating through a predetermined time cycle, the effective work done is much greater by the coil constructed as taught by applicant.

In Fig. 4 I illustrate a coil in which the heat conductive strips are positioned directly on the layers of wire without insulation between. This causes more rapid dissipation of the heat from the center of the coil, and permits the flow of additional current without the overheating of the center of the coil.

Having described my invention, what I claim and desire to secure by Letters Patent is:

1. In a device of the character described including a channel-like secondary winding, a primary winding carried in the channel of said secondary winding, said primary winding comprising a plurality of turns of electrical conductors arranged in layers, pairs of heat and electrical conductive elements positioned between said layers in overlying relation, the elements of said pairs being alternately connected to the opposite ends of said channel-like secondary winding, there being an insulating medium between the overlying portions of said heat and electrical conducting elements of each pair.

2. In a device of the character described including a channel-like secondary winding having a primary winding comprising a plurality of layers of electrical conductors surrounding it and closely held thereby, the combination of pairs of heat and electrical conductive elements positioned between the respective layers of said primary winding, said heat conductive elements of each pair being alternately connected to the opposite ends of said secondary winding, there being an electrical insulating medium positioned between the elements comprising said pairs of heat conductive elements.

3. In a device of the character described including a secondary winding and a primary winding thereon, said primary winding comprising a plurality of layers of electrical conductors, the combination of a heat and electrical conductive element secured at one end to one end of said secondary winding and extending between two layers of the primary winding, the other end of said heat conductive element terminating in spaced relation with the other end of said secondary winding, another heat and electrical conductive element secured to the last named end of said secondary winding and extending between the same two layers of the primary winding and terminating in spaced relation with the first named end of said secondary winding, and an electrical insulating medium positioned between the said heat and electrical conductive elements.

4. In a transformer comprising a unitary secondary winding and a multiple layer primary winding, the combination of a plurality of copper strips electrically connected alternately to opposite ends of said secondary winding, said copper strips being arranged in pairs, the elements of each pair extending between the layers of electrical conductors comprising the primary winding and overlying one another, and an electrical insulating element positioned between the elements comprising each pair.

IAN C. McKECHNIE.

REFERENCES CITED

The following references are of record in the file of this patent:

UNITED STATES PATENTS

| Number | Name | Date |
|---|---|---|
| 981,690 | Rhodes | Jan. 17, 1911 |
| 1,809,895 | Gay | June 16, 1931 |
| 2,161,192 | Peterson | June 6, 1939 |
| 2,220,539 | Panov et al. | Nov. 5, 1940 |

FOREIGN PATENTS

| Number | Country | Date |
|---|---|---|
| 171,836 | Great Britain | Dec. 1, 1921 |